Figure 1:
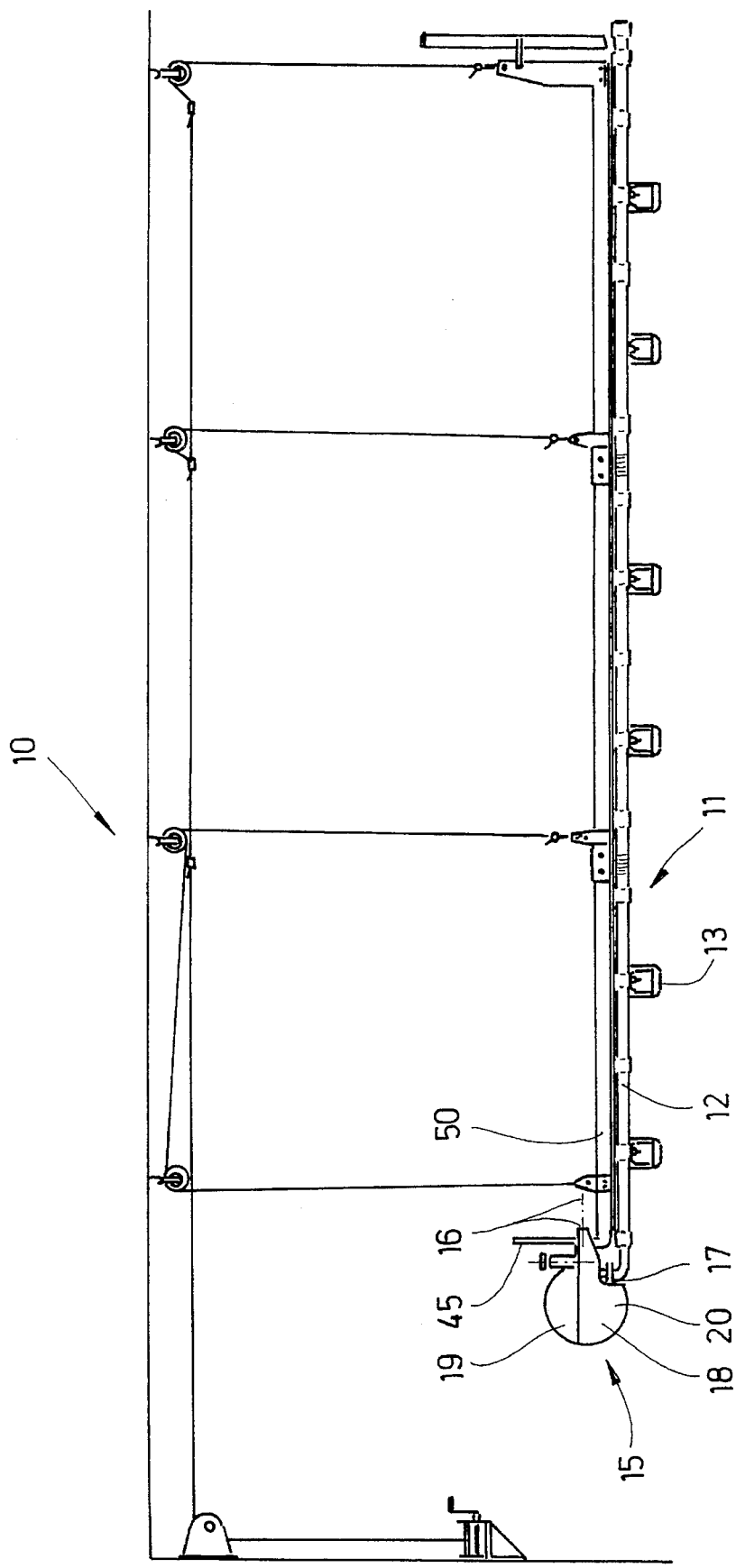

United States Patent [19]

Schumacher

[11] Patent Number: 5,497,731
[45] Date of Patent: Mar. 12, 1996

[54] WATER STORAGE TANK FOR AN ANIMAL WATERING TROUGH

[75] Inventor: Egon Schumacher, Barnstorf, Germany

[73] Assignee: Lubing Maschinenfabrik Ludwig Bening GmbH & Co. KG, Barnstorf, Germany

[21] Appl. No.: 118,526

[22] Filed: Sep. 9, 1993

[30] Foreign Application Priority Data

Sep. 10, 1992 [DE] Germany .................. 9212208 U

[51] Int. Cl.$^6$ ........................................... A01K 7/00
[52] U.S. Cl. ........................................... 119/78
[58] Field of Search .................. 119/72, 72.5, 78, 119/75

[56] References Cited

U.S. PATENT DOCUMENTS

| 2,904,004 | 9/1959 | Bruns et al. | 119/78 |
| 3,664,305 | 5/1972 | Hart et al. | 119/72 |
| 3,724,425 | 4/1973 | Thompson | 119/72 |
| 4,794,881 | 1/1989 | Rader | 119/72.5 |
| 5,063,878 | 11/1991 | Hostetler | 119/72 X |
| 5,136,983 | 8/1992 | Hostetler | 119/72 |

FOREIGN PATENT DOCUMENTS

| 7973939 | 4/1965 | Germany . |
| 2656453 | 6/1978 | Germany . |
| 3202246 | 8/1983 | Germany . |
| 8915225 | 2/1990 | Germany . |

*Primary Examiner*—Thomas Price
*Attorney, Agent, or Firm*—Deveau, Colton & Marquis

[57] ABSTRACT

Water storage tanks (15) for animal watering troughs serve for reducing the water pressure of a water supply pipe which feeds the watering line to a defined lower watering pressure. In contrast, water of a higher rinsing pressure is required for rinsing the animal watering trough. For this purpose, the water supply pipe has to be connected directly to the watering line via a bypass which bridges the water supply tank (15).

To avoid the bypass pipe, the water supply tank (15) is constructed according to the invention in such a way that its regulating device (27) can be retained in a position which does not reduce the water pressure. In this way, water for rinsing the watering line can flow from the water supply pipe with non-reduced pressure through the water storage tank (15), which obviates the need for a bypass pipe.

19 Claims, 6 Drawing Sheets

WATER STORAGE TANK FOR AN ANIMAL WATERING TROUGH

The invention relates to a water storage tank for an animal watering trough according to the preamble of claim 1.

Animal watering troughs, specifically in particular line watering troughs, having a watering line which has a plurality of watering places are supplied with water via a water storage tank. The water storage tank serves to reduce the water pressure of a water supply pipe which feeds the watering line to a defined lower pressure (watering pressure). In contrast, water of a higher pressure (rinsing pressure), namely the pressure in the water supply pipe, is required for rinsing the animal watering trough. For this purpose, the water from the water supply pipe is fed directly to the watering line via a separate bypass which bridges the water storage tank. This bypass is quite complex.

Setting out from the above, the invention is based on the object of providing a water storage tank for an animal watering trough, which water storage tank allows the animal watering trough to be changed over from a watering position to a rinsing position (and vice versa) with little effort.

According to the invention, this object is achieved by a water storage tank having the features of claim 1. According to the invention, the regulating device can be retained in its position which constantly releases the water inflow. The regulating device can thus be put out of operation temporarily, as a result of which water having the rinsing pressure can be conducted from the water storage tank into the watering line. In this way, the water storage tank can be brought alternatively both into a watering position and into a rinsing position. This obviates the need for the bypass required in the prior art.

The water storage tank is preferably of watertight construction, at least in the rinsing position. It is thus ensured that a (higher) rinsing pressure can be set in the water storage tank without water flowing out of the water storage tank. In a preferred embodiment of the invention, the water storage tank is sealed off in the rinsing position by an actuator which retains the regulating device. If, in contrast, the actuator releases the regulating device in the operating position, the water storage tank is aerated and vented, as a result of which water having a lower watering pressure can flow out of the water storage tank.

Additional further developments of the invention emerge from the subclaims and the description.

Figure 2:
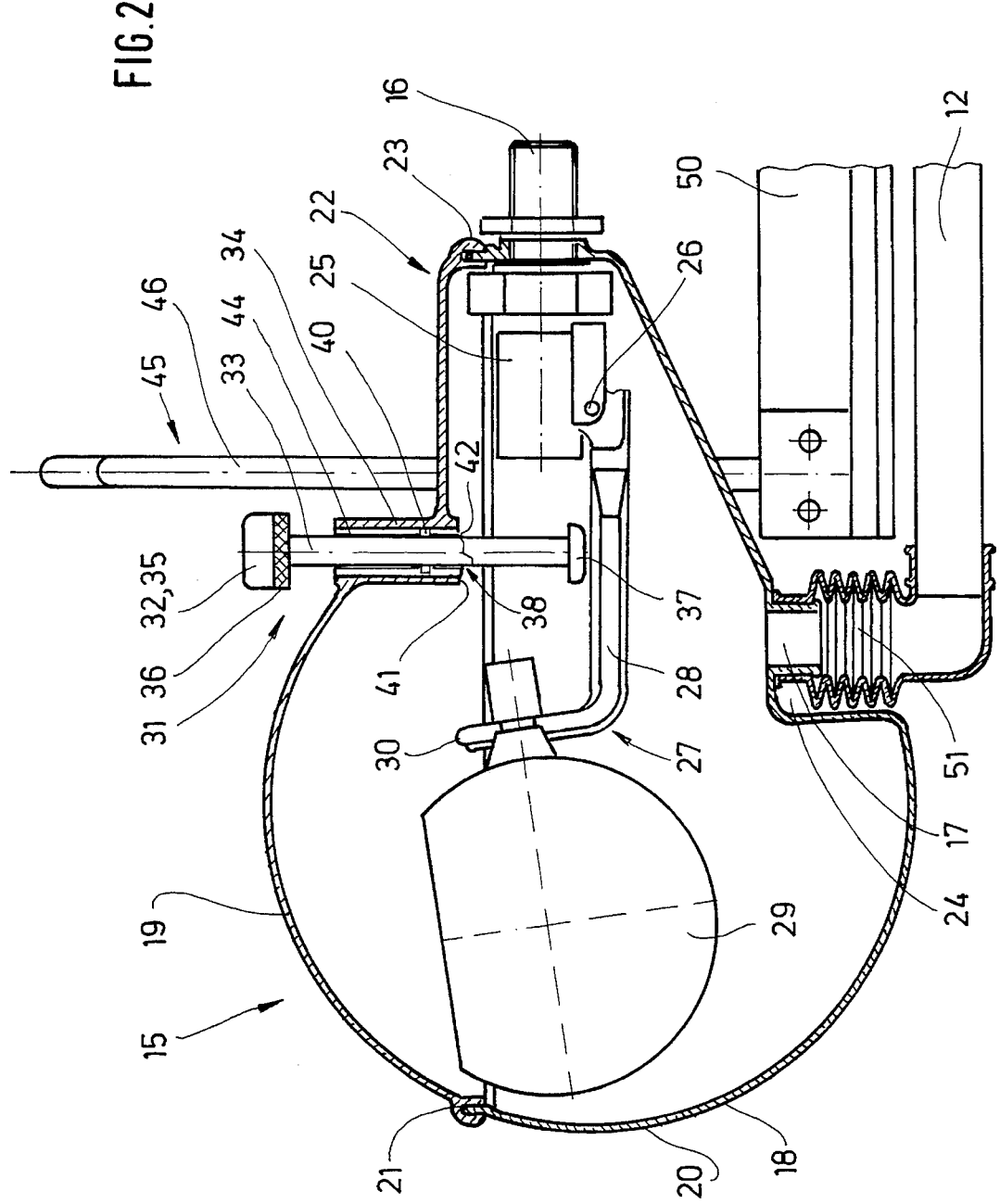
Figure 3:
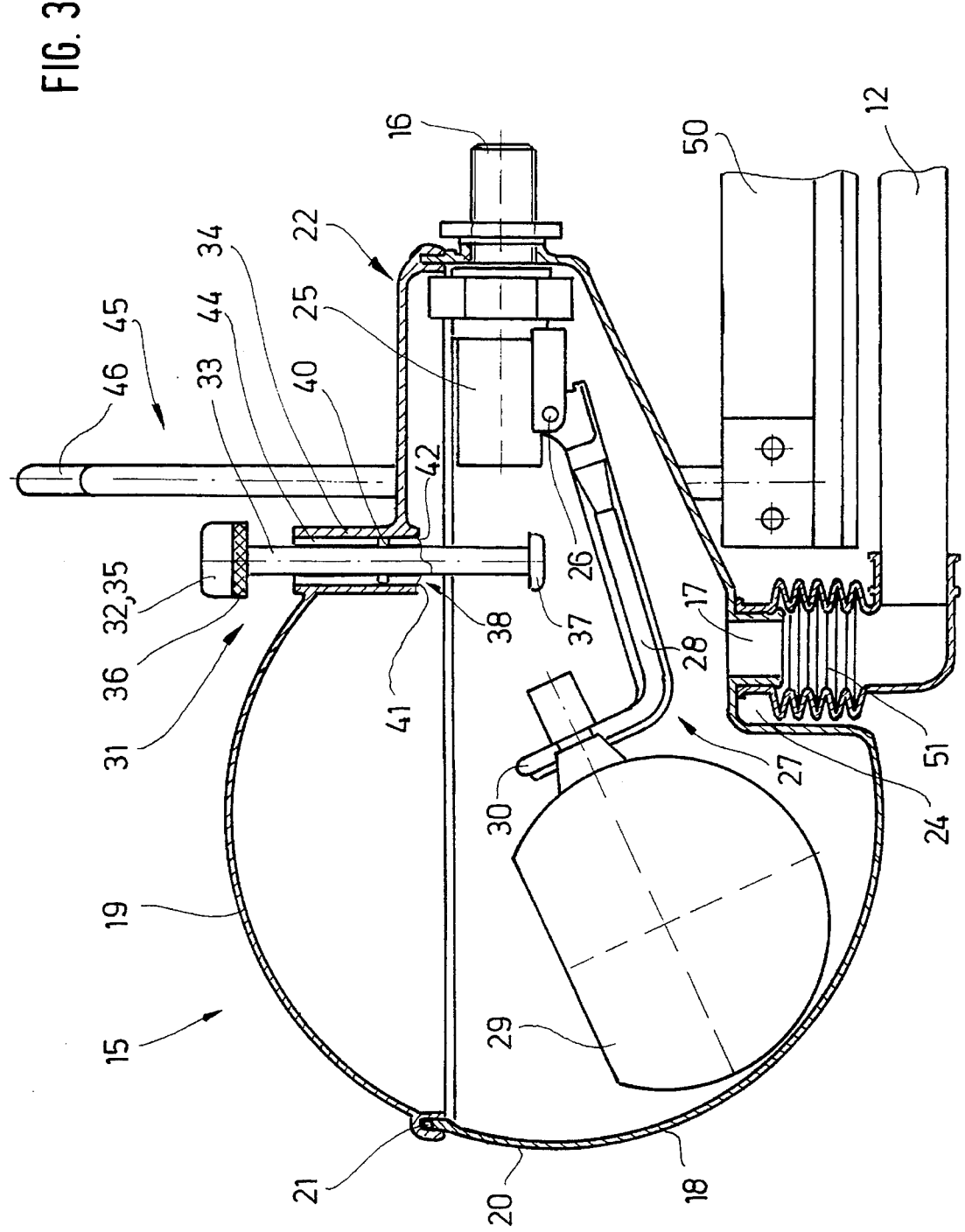
Figure 4:
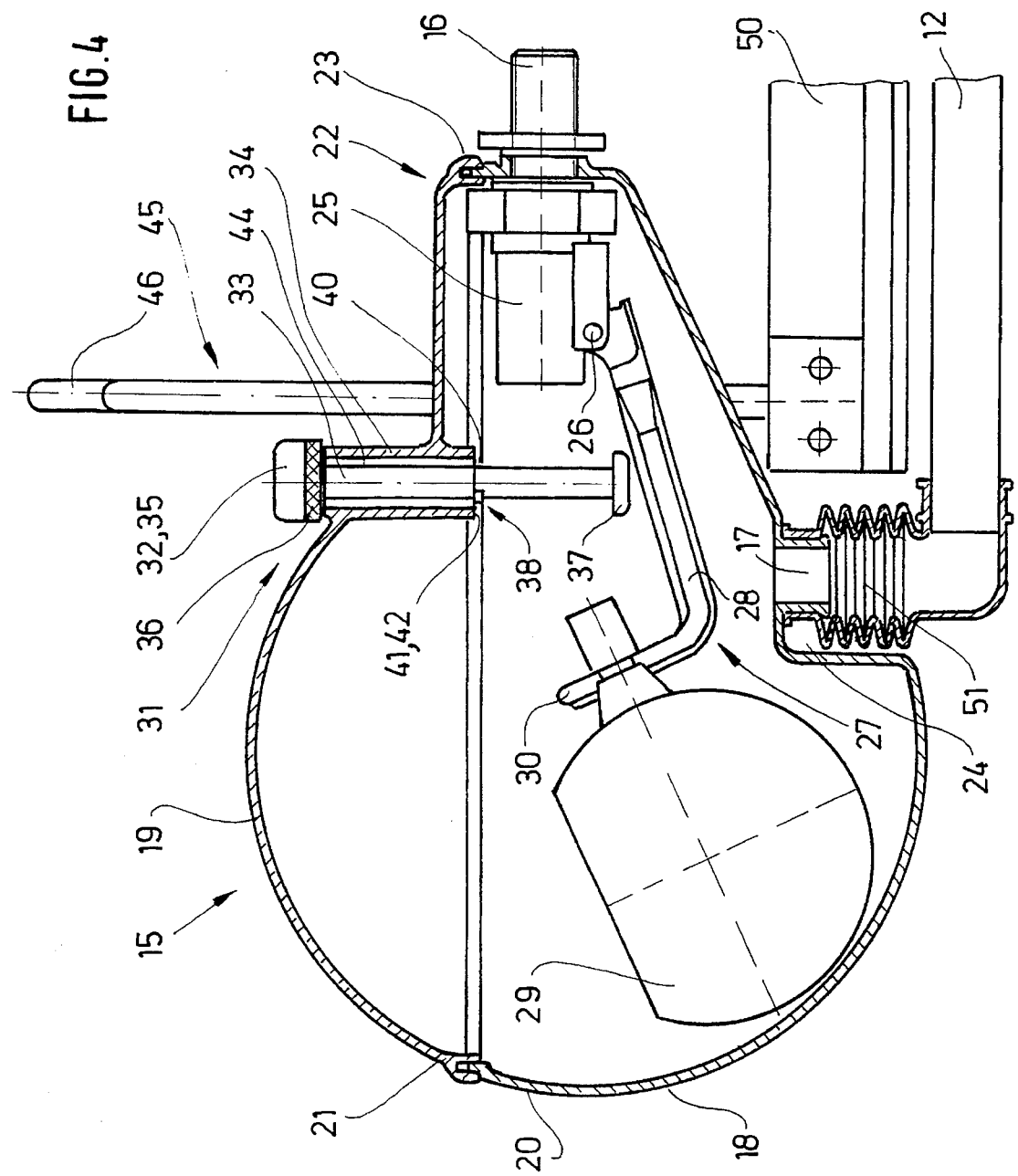
Figure 5:
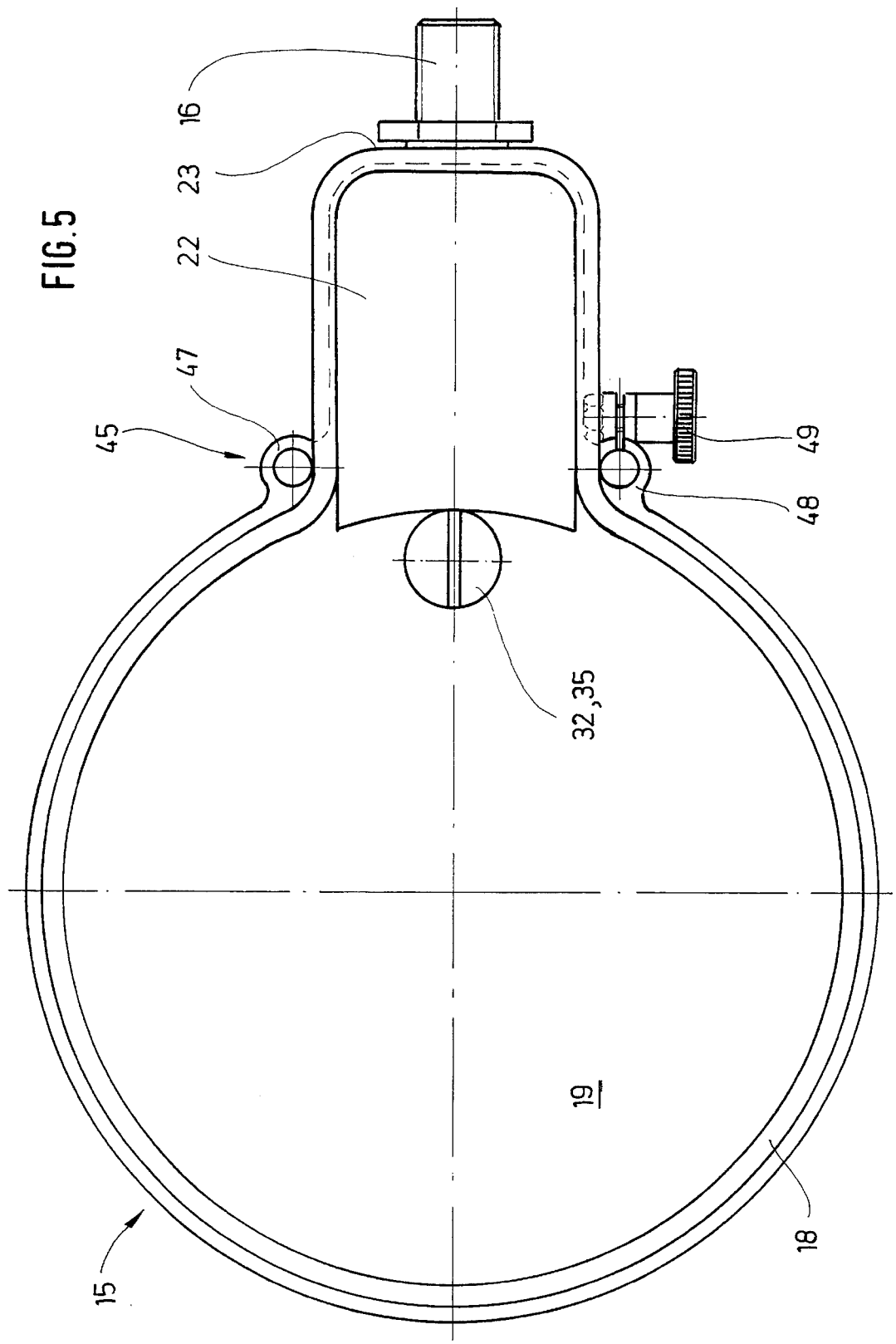
Figure 6:
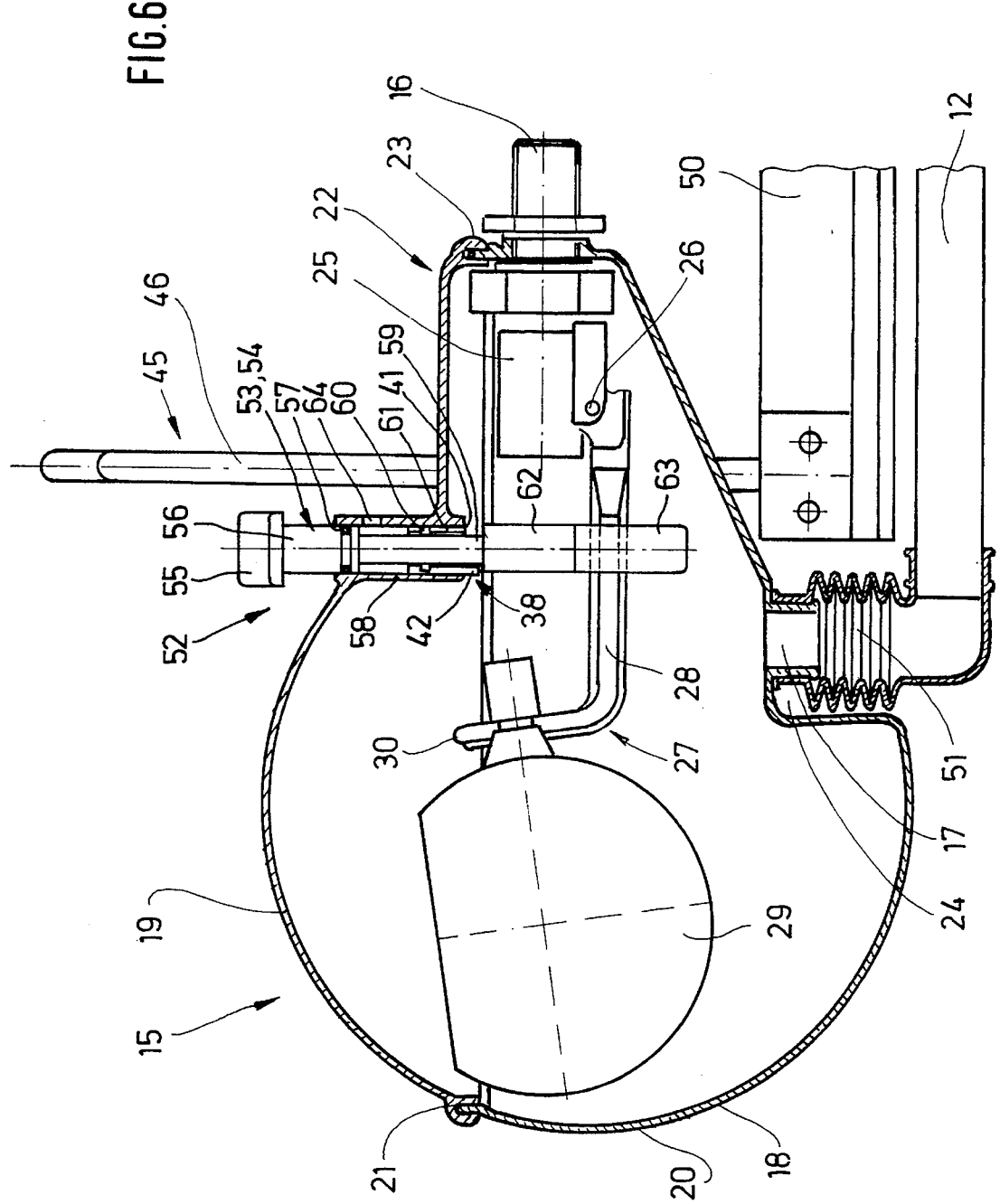

Preferred exemplary embodiments of the invention are described in greater detail below with reference to the drawing, in which:

FIG. 1 shows a front view of an animal watering trough,

FIG. 2 shows a vertical section through a water storage tank in its watering position, FIG. 3 shows a further vertical section through the water storage tank in analogy to FIG. 2 in a different watering position, FIG. 4 shows a vertical section through the water storage tank in analogy to FIGS. 2 and 3 in a rinsing position, FIG. 5 shows a plan view of the water storage tank, and FIG. 6 shows a vertical section (in analogy to FIG. 2) through a water storage tank according to a second exemplary embodiment of the invention.

The animal watering trough illustrated in FIG. 1 is constructed as a line watering trough 11 for supplying water for small animals, in particular hens. The line watering trough 11 has a watering line 12 which is assigned a multiplicity of watering places 13. The watering places 13 are supplied with water from the water-conducting watering line 12.

The watering line 12 is fed with water from a water outflow 17 of the water storage tank 15 (FIGS. 2 to 5). For this purpose, the water feedpipe 14 indicated in FIG. 1 is connected to a water inflow 16 of the water storage tank 15, which water inflow opens out substantially horizontally into the water storage tank 15.

In the exemplary embodiment shown, the water storage tank 15 has an approximately spherical housing 18 which is composed of two halves 19, 20. Between the two halves 19, 20 there is a sealing arrangement 21, by means of which the halves 19, 20 of the housing 18 are connected to each other in a water-tight manner. The housing 18 is provided on one side with a protrusion 22 which extends substantially radially and horizontally. The water inflow 16 is located at one end face 23 of the protrusion 22. From the end face 23, in turn, the protrusion 22 extends on one side in the direction of a housing corner 24 which is arranged below said protrusion and laterally offset relative thereto and to which the water outflow 17 is assigned.

Inside the housing 18, the water inflow 16 is provided with a valve 25 for the alternative opening and closing of the water inflow 16. Assigned to the valve 25 is a regulating device 27 which can be pivoted about a pivot axle 26 and either opens or closes the valve 25 and thus the water inflow 16—in dependence on its relative position.

The regulating device 27 consists of an actuating lever 28 and a float 29 which is attached adjustably to one end of the actuating lever 28. On the side facing away from the pivot axle 26 and the valve 25, the actuating lever 28 has a holding web 30 which is bent upwards virtually at right angles. The float 29 is attached thereto in such a way that it can be displaced and retained in the appropriate position for setting the regulating device 27 to the desired watering pressure.

FIG. 2 illustrates the water storage tank 15 in a (first) watering position of the line watering trough 11. In this position, water having a watering pressure which is reduced relative to the pressure in the water feedpipe 14 can be fed to the watering line 12 via the water outflow 17. In this case, the regulating device 27 assumes an upper end position which closes the valve 25 and the water inflow 16. When the water level in the water storage tank 15 drops, the float 29 moves the actuating lever 28 downwards. FIG. 3 shows the lower position of the float 29 and of the actuating lever 28. This corresponds to a (second) watering position of the line watering trough 11, in which position the valve 25 and thus the water inflow 16 are opened. The water storage tank 15 is thus filled with water from the water feedpipe 14 until the float 29 of the regulating device 27 has again reached the (first) watering position illustrated in FIG. 2, in which position the actuating lever 28 closes the water inflow 16 via the valve 25.

FIG. 4 illustrates the water storage tank 15 in a rinsing position of the line watering trough 11. In this position, the regulating device 27 is retained in its lower end position. In this position, the valve 25 is permanently open such that water can flow constantly out of the water feedpipe 14 into the water storage tank 15 via the water inflow 16. The water storage tank 15, which is sealed off water-tightly when the regulating device 27 is retained, is thus completely filled with water. A pressure corresponding to the pressure in the water feedpipe 14 thus builds up in the water storage tank 15. With this (high) pressure, namely the rinsing pressure, the watering line 12 is supplied with water in the rinsing position.

A retaining device 31 serves for retaining the regulating device 27 in the rinsing position of the line watering trough 11. The retaining device 31 is formed by an actuator 32 which can be fixed in a defined position in the housing 18. In this position illustrated in FIG. 4, the actuator 32 retains the actuating lever 28 of the regulating device 27 in a lower position which constantly keeps the valve 25 open.

The actuator 32 has an elongate shaft 33 with which it is held so as to be longitudinally displaceable in a correspondingly constructed bush 34 of the housing 18. Outside the housing 18, the actuator 32 has an actuating head 35 which serves for operating the actuator 32. On the side facing the housing 18, the actuating head 35 is assigned a seal 36. By means of the latter, the housing 18 is closed water-tightly at the bush 34 when the actuator 32 is fixed in the rinsing position illustrated in FIG. 4. At its end located inside the housing 18, the shaft 33 has a foot 37 which, in the rinsing position, rests against the upper side of the actuating lever 28 (FIG. 4).

A fixing device 38 of bayonet-type construction in this case is provided for fixing the actuator 32 in the rinsing position illustrated in FIG. 4. The fixing device 38 has, on the one hand, two projections 40 located opposite each other on the shaft 33 of the actuator 32. On the other hand, the fixing device 38 is provided with projections 42 arranged on the lower end face 41 of the bush 34. In the direction towards the projections 42, the end face 41 of the bush 34 can be constructed in the manner of a ramp. By pressing down and subsequently turning the actuator 32, the projections 40 in the shaft 33 of the actuator 32 come to rest on the end face 41 and the projections 42 of the bush 34 of the housing 18. The retaining device 31 is thus secured in the rinsing position of the line watering trough 11. At the same time, by a corresponding arrangement of the projections 40 on the shaft 33, the seal 36 of the actuator 32 is clamped fixedly between the actuating head 35 and the bush 34 for the secure sealing of the housing 18.

In the watering position of the line watering trough 11, the fixing device 38 of the actuator 32 is released. In this case, the actuating head 35 with the seal 36 is raised from the bush 34 of the housing 18, that is to say the seal 36 is ineffective. In this position of the actuator 32, the projections 40 on the shaft 33 are received in continuous grooves 44 located opposite each other in the bush 34. At the same time, the continuous grooves 44 serve for venting the housing 18 in the watering position. For effective venting, the bush 34 may be assigned additional grooves.

The water storage tank 15 is vertically adjustable relative to the line watering trough 11. The water level in the water storage tank 15 can thus be varied in height relative to the watering line 12 to set the desired watering pressure. For this purpose, the water storage tank 15 is attached to a holder 45 which is connected to a support profile 50 for holding the watering line 12 (FIG. 1). The holder 45 has two parallel guides 46 which extend through two corresponding guide bushes 47 and 48 on the housing 18. The guide bush 48 is slotted and thus variable in diameter by means of a hurled screw 49 for clamping the housing 18 fixedly on the corresponding guide 46 of the holder 45.

The water outflow 17 of the water storage tank 15 is connected to the watering line 12 via bellows 51. The bellows 51 is variable in length to bridge the change in spacing of the water outflow 17 relative to the watering line 12, which occurs during the vertical adjustment of the water storage tank 15.

FIG. 6 shows a second exemplary embodiment of the water storage tank 15. This one differs from the water storage tank 15 illustrated in FIGS. 1 to 5 due to the retaining device 52. Otherwise the water storage tank 15 of this second exemplary embodiment corresponds to the first exemplary embodiment, the same reference numerals being used for the same or similar parts.

The retaining device 52 has an actuator 53 with a multi-stage shaft 54. An upper part of the shaft 54 starting from the actuating head 55 of the actuator 53 is constructed as a sealing section 56 on which a sealing ring 57 is arranged. The sealing section 56 is constructed to correspond to the inside diameter of a bush 58 in the upper half 19 of the housing 18. The actuator 53 is sealed off relative to the bush 58 via the sealing ring 57. Below the sealing section 56, the shaft 54 has a central section 59 which is reduced in diameter relative to the inside diameter of the bush 58. The central section 59 is provided with projections 60 which are located opposite each other and are guided in continuous grooves 61 in the lower end region of the bush 58.

A U-shaped bar 62 is connected to the lower end of the central section 59. The U-shaped bar 62 has two parallel limbs 63 which point downwards and are assigned to opposite sides of the actuating lever 28 of the regulating device 27, specifically in such a way that they do not affect the free upward and downward movement of the regulating device 27 in the position of the actuator 53 illustrated in FIG. 6, namely the watering position. The actuating lever 28 is guided between the limbs 63 of the actuator 53 to prevent lateral drifting.

The actuator 53 can be moved upwards and downwards in the bush 58. In the upper position of the actuator 53 corresponding to the watering position illustrated in FIG. 6, the inside of the water storage tank 15 is aerated by means of a lateral bore 64 in the bush 58. The lateral bore 64 is assigned to the bush 58 in the upper region in such a way that, in the rinsing position of the water storage tank in which the actuator 53 is pressed down, the sealing ring 57 is located on the sealing section 56 of the actuator 53 below the lateral bore 64 and the inside of the water storage tank 15 is thus sealed off. The actuator 53 is retained in the rinsing position in a bayonet-like manner, in that the projections 52 come to rest on the central section 59 of the shaft 54 below the end face 41 of the bush 58 in a similar manner to that of the exemplary embodiment described first. At the same time, the actuating lever 28 of the regulating device 27 is pressed down by the U-shaped bar 62 at the lower end of the shaft 54 and held in a position corresponding to FIG. 4 of the previously described exemplary embodiment.

I claim:

1. A water storage container for an animal watering trough, said container comprising:

a housing having a water inflow aperture formed therein for receiving water into said container supplied thereto at a first water pressure, said housing having a water outflow aperture formed therein for supplying water contained in said container to an animal watering trough at a second water pressure;

regulating means movably mounted in said housing for automatically regulating the amount of water entering said container through the water inflow aperture; and retaining means movably mounted to said container for retaining said regulating means in an inoperative position to thereby prevent said regulating means from regulating the amount of water entering said container through the water inflow aperture, said retaining means comprising a first portion disposed outside of said container and a second portion, mechanically coupled by a mechanical coupling means to said first portion, disposed inside of said container proximate a portion of said regulating means such that a force applied to said first portion is translated to said regulating means whereby said regulating means is retained in the inoperative position.

2. A water storage container as claimed in claim 1, wherein said first portion, said second portion and said mechanical coupling means constitute an actuator which can be fixed in a defined position relative to said housing.

3. A water storage container as claimed in claim 2, wherein said housing is sealed when said retaining means is retaining said regulating means in the inoperative position.

4. A water storage container as claimed in claim 3, wherein said first portion is an actuating head and said second portion is an actuating foot and wherein said mechanical coupling means is an elongated shaft, and wherein the elongated shaft is mounted in the housing so as to be axially displaceable in a corresponding bush.

5. A water storage container as claimed in claim 4, wherein the actuating head has a seal thereon.

6. A water storage container as claimed in claim 5, wherein the seal is arranged in a sealing manner between the actuating head and the housing when said retaining means is retaining said regulating means in the inoperative position.

7. A water storage container as claimed in claim 4, wherein said retaining means includes a fixing device for fixing said actuator in a defined position which seals said housing when said retaining means is retaining said regulating means in the inoperative position.

8. A water storage container as claimed in claim 7, wherein the fixing device is formed by at least one projection on the actuator and by an end face of the bush.

9. A water storage container as claimed in claim 8, wherein the end face has at least one projection thereon such that the projections on the shaft and end face can be locked in a bayonet closure manner relative to the end face as a result of rotary movement of the actuator.

10. A water storage container as claimed in claim 8, wherein the bush has a through-bore which corresponds to at least one part of the shaft, said bore having at least one groove for receiving the projection of the shaft during the axial displacement of the actuator.

11. A water storage container as claimed in claim 2, wherein said housing can be sealed off by the actuator when said retaining means is retaining said regulating means in the inoperative position.

12. A water storage container as claimed in claim 1, wherein said retaining means is constructed as a venting device for which vents said housing when said retaining means is not retaining said regulating means in the inoperative position.

13. A water storage container as claimed in claim 1, wherein the housing is vertically adjustable relative to an animal watering line which delivers water from the water outflow aperture to the animal watering trough.

14. A water storage tank for an animal watering trough, said water storage tank comprised of a housing of substantially sealed construction, said housing having a regulating device arranged therein which automatically opens and closes, a water inflow aperture when the water level in the water storage tank falls below a first level and rises above a second level, respectively, such that water having a watering pressure exits the water storage tank through a water outflow aperture, and wherein said water storage tank also comprises a retaining device which comprises an actuator which can be positioned against said regulating device such that said regulating device is maintained in a rinsing position, wherein while said regulating device is maintained in the rinsing position, the water inflow aperture is kept open such that water having a rinsing pressure exits the water storage tank through the water outflow aperture, and wherein the rinsing pressure is greater than the watering pressure.

15. A water storage tank as claimed in claim 14, wherein the actuator has an elongated shaft which is mounted in the housing so as to be axially displaceable in a corresponding bush, said housing being sealed off by the actuator when the actuator is positioned against said regulating device such that said regulating device is maintained in a rinsing position, and wherein said retaining device is constructed as a venting device of the housing when the actuator is not positioned against said regulating device.

16. A water storage tank as claimed in claim 15, wherein the actuator has an actuating head which is located outside the housing which has a seal thereon which is arranged in a sealing manner between the actuating head and the housing when the actuator is positioned against said regulating device such that said regulating device is maintained in a rinsing position.

17. A water storage tank as claimed in claim 15, further comprising a fixing device for maintaining the actuator positioned against said regulating device such that said regulating device is maintained in the rinsing position, said fixing device being formed by at least one projection located on the shaft of the actuator running transversely to the shaft of the actuator and by a lower end face of the bush.

18. A water storage tank as claimed in claim 17, wherein the end face is assigned at least one projection such that the projections on the shaft and end face can be locked in a bayonet closure manner relative to the end face as a result of rotary movement of the actuator, and wherein the bush has a through-bore which corresponds to at least one part of the shaft, said through-bore having at least one groove for receiving the projection of the shaft during axial displacement of the actuator.

19. A water storage tank as claimed in claim 14, wherein the housing is mounted on a support profile of a watering line via a holder arranged substantially vertically and wherein said housing can be displaced by said support profile vertically relative to the watering line while it is retained on said support profile.

* * * * *